(12) United States Patent
Moesby

(10) Patent No.: US 6,527,195 B2
(45) Date of Patent: Mar. 4, 2003

(54) REGULATING INSERT TO BE PLACED IN VALVES, AND VALVE UNIT

(75) Inventor: Niels Peter Moesby, Slagelse (DK)

(73) Assignee: Flowcon International A/S, Slagelse (DK)

(*) Notice: Subject to any disclaimer, the term of this patent is extended or adjusted under 35 U.S.C. 154(b) by 0 days.

(21) Appl. No.: 10/196,238

(22) Filed: Jul. 17, 2002

(65) Prior Publication Data

US 2002/0179724 A1 Dec. 5, 2002

Related U.S. Application Data

(63) Continuation of application No. PCT/DK01/00040, filed on Jan. 19, 2001.

(30) Foreign Application Priority Data

Jan. 21, 2000 (DK) .......................................... 2000 00097
Jul. 13, 2000 (DK) .......................................... 2000 01084

(51) Int. Cl.$^7$ ........................... F25D 17/02; G05D 23/00
(52) U.S. Cl. .................................... 236/92 R; 137/503
(58) Field of Search ...................... 236/92 R; 237/500, 237/501, 503

(56) References Cited

U.S. PATENT DOCUMENTS

| 3,752,183 A | 8/1973 | Griswold ................... 137/504 |
| 3,955,595 A | 5/1976 | Modes ........................ 137/517 |
| 4,081,171 A | 3/1978 | Morgan et al. ................ 251/30 |
| 4,454,982 A | * 6/1984 | Reick et al. ............... 236/92 R |
| 4,611,629 A | 9/1986 | Seiffert ................... 137/614.21 |
| 5,178,324 A | 1/1993 | Moesby ..................... 237/8 R |
| 5,368,227 A | * 11/1994 | McGinnis ................. 236/92 R |
| 6,394,361 B1 | 5/2002 | Fridmann et al. ........... 237/8 A |

FOREIGN PATENT DOCUMENTS

| DE | 22 58 787 B2 | 6/1973 |
| DE | 199 56 819 A1 | 5/2000 |
| DK | 8760 | 8/1906 |
| EP | 0 677 708 A2 | 10/1995 |
| WO | WO 95/12082 | 5/1995 |

* cited by examiner

*Primary Examiner*—William E. Tapolcai
(74) *Attorney, Agent, or Firm*—Pennie & Edmonds LLP

(57) ABSTRACT

A regulating insert for mounting in valves includes a dynamically flow regulating body, with the body having a first housing that is disposed within a second housing. A coil spring is arranged about an axis thereof, and a first end of the coil spring engages a slidable bottom cup provided with at least one inlet opening for liquid in its wall. The opening has an adjustable flow area. The second end of the coil spring opposite the first end engages a partly closed end of the second housing. The partly closed end has a cylindrical opening that provides a seat for a valve cone situated within the second housing. The position of the valve cone is regulated by first means via an activation means.

21 Claims, 3 Drawing Sheets

REGULATING INSERT TO BE PLACED IN VALVES, AND VALVE UNIT

CROSS-REFERENCE TO RELATED APPLICATIONS

This application is a continuation of the U.S. National Stage designation of co-pending International Patent Application PCT/DK01/00040, filed Jan. 19, 2001, the entire content of which is expressly incorporated herein by reference thereto.

FIELD OF THE INVENTION

The invention relates to a regulating insert for mounting in valves and comprising a dynamically flow regulating body, said body comprising a first housing within a second housing with a coil spring arranged parallel to the axis thereof, said coil spring engaging at its first end a slidable bottom cup provided with at least one inlet opening for liquid in its wall, said opening having an adjustable flow area.

The invention also relates to a valve unit for dynamic flow regulation comprising a regulating insert, said regulating insert comprising a dynamically flow regulating body, said body comprising a first housing within a second housing with a coil spring arranged parallel to the axis thereof, said coil spring engaging at its first end a slidable bottom cup provided with at least one inlet opening for liquid in its wall, said opening having an adjustable flow area.

BACKGROUND OF THE INVENTION

In connection with flow and temperature regulation in closed systems, it is known to have a separately mounted flow regulating valve and a separately mounted thermostatic valve. In for example air conditioning plants, such a system is known where a thermostat is mounted upstream of each unit requiring heat regulation and a regulating valve is mounted downstream of each unit.

Likewise in connection with radiators for buildings it is known to mount a thermostat upstream of each radiator, whereas a single regulating valve for controlling the total flow is mounted somewhere in the system.

Flow regulating bodies operating according to static principles are for example known from U.S. Pat. No. 4,611,629 describing a thermostatic valve comprising an adjustable limitation of the valve control such that a static limitation of the flow through the valve is obtained. In connection with such a thermostat a regulation of the flow through the valve is obtained by the operation of the thermostatic function as an authority during a certain interval where after it will lose its authority and the flow will be limited to a maximum flow, which will only be dependent of the pressure difference and the valve but still, however, vary by variating pressure difference.

Similarly, regulating inserts are known which operate according to dynamic flow regulation principles, in other words, where the flow is controlled via a spring by a differential pressure measured as the difference between the inflow and outflow of the body. By increasing pressure in the body, the differential pressure will fall.

It is the object of the present invention to provide an insert as well as a valve where a regulation of the flow takes place in such a manner that this is constant by the unit comprising a regulating body, which is regulated by the differential pressure, but also a further regulation by the temperature via its seat part in such a manner that the spring and hence the flow are regulated partly by the differential pressure and partly by the pressure of the piston on same.

The result is that by a simple replacement of the spring regulating the differential pressure, it is possible to obtain a big efficiency interval for the same product incidentally, and where such a product may easily be integrated into flow systems, such as air conditioning plants and floor heating regulation in that it is easier to accommodate and has fewer pipe joints such that there is less risk of leakages. Moreover, it is of course cheaper to install.

As additional advantages it should be mentioned that by having a constant flow in a big system, for example in a hotel group of buildings, where the temperature regulation is made by several separate units, the comfort will not be stolen from the remaining units in case a single unit wishes to optimize its comfort range at the very moment.

SUMMARY OF THE INVENTION

The invention relates to a regulating insert for mounting in valves and including a dynamically flow regulating body, the body having a first housing within a second housing with a coil spring arranged parallel to the axis thereof. The coil spring engages at its first end a slidable bottom cup provided with at least one inlet opening for liquid in its wall, with the opening having an adjustable flow area. The second end of the coil spring opposite the first end engages a partly closed end of the second housing, with the partly closed end having a cylindrical opening providing the seat of a valve cone situated within the second housing. The position of the valve cone is regulated by first means via an activation means.

The invention further relates to a valve unit for dynamic flow regulation including a regulating insert, with the regulating insert having a dynamically flow regulating body. The body includes a first housing within a second housing with a coil spring arranged parallel to the axis thereof. The coil spring engages at its first end a slidable bottom cup provided with at least one inlet opening for liquid in its wall, with the opening having an adjustable flow area. The second end of the coil spring opposite the first end engages a partly closed end of the second housing, with the partly closed end including a cylindrical opening providing the seat of a valve cone situated within the second housing. The position of the valve cone is regulated by first means via an activation means.

With respect to the regulating inserts, the first means may be a thermostat or an actuator thus making it possible to obtain an integrated system by actuating the valve cone. The second housing may be a compression spring surrounding a spindle/piston rod, with the spindle/piston rod connecting the valve cone with the activation means, thus achieving an advantageous actuation of the valve cone. The first housing may be mounted parallel to the axis of and within the second housing between which at least one seal ring may be situated, so that a tight fit between the body and the insert housing itself is obtained thereby avoiding leakages. Also, the second housing may include a spring ring arranged at the bottom of the second housing and opposite the position of the compression spring. Thus, the body may be inserted in the valve in a unique manner, said spring ring being preferably produced in spring steel and accordingly securing the position of the body within the insert housing.

The regulating inserts and valve units may be used for air conditioning systems and/or floor heating systems.

The product accordingly functions by regulating the body via the differential pressure under the action of a slidable part adjusting itself to a certain level, whereby the openings of the body allowing a medium flow are more or less cut off, whereby the inlet opening is regulated as the highest priority with the object of limiting the flow in a dynamic manner to a maximum flow through the valve. Since the discharge opening of the body also functions as the seat of a thermostatically activated or actuator activated valve cone, there is achieved a further regulation option with a lower priority, for example, of the comfort temperature in a living room.

The determining factor for the level of activity of the valve is determined by the thermostatic function and the pressure conditions in the system wherein the valve is mounted. In case the thermostat calls for more flow and the differential pressure on the valve is at the same time so big that without the flow regulating body the result will be too big a flow, the authority will exclusively be safeguarded by the flow regulating body. In case the thermostat calls for a flow level which is smaller than the maximum flow defined relative to the flow regulating body, the authority will exclusively be safeguarded by the thermostat.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF PREFERRED EMBODIMENTS

Figure 1A:
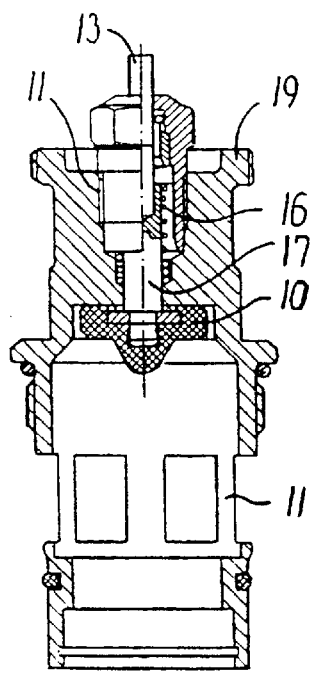
FIG. 1A shows a partial exploded view of the main elements of the regulating insert, including a spring ring, according to the present invention.
Figure 1A:
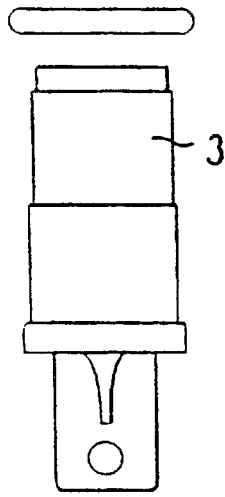
Figure 1B:
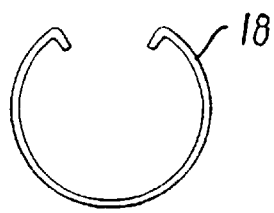
FIG. 1B shows a plane view of the spring ring of FIG. 1A.
Figure 1C:
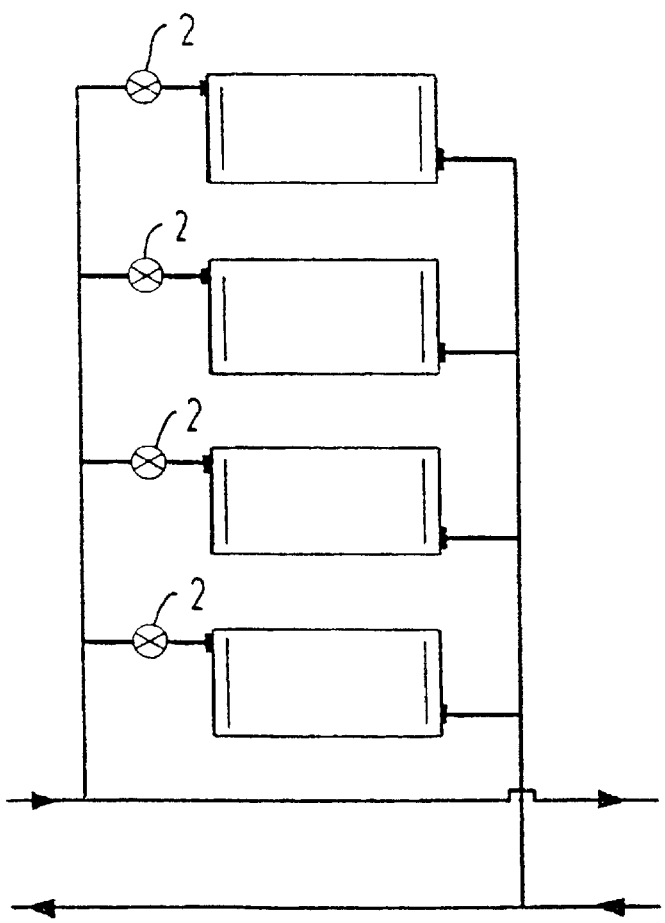
FIG. 1C shows the placing of the valve unit for an air conditioning system.

FIGS. 1A–1C show the main elements for the regulating insert 1 according to the present invention and how the regulating insert 1, having been assembled to form an integral plug-in unit, is subsequently fitted in a valve 2 for regulating a flow.

Seen in an exploded drawing, the regulating insert 1 in FIG. 1A comprises a dynamical flow regulating body 3 for fitting in the valve unit 2.

A static limitation of the flow through a restriction may be described by analyzing the mathematical correlation which applies to flowing media:

$$Q = Kv \cdot DP^{1/2}$$

where Q is the flow. Kv is a valve coefficient, which is predominantly given by the smallest restriction area which the flowing medium is to pass in a valve. DP is the pressure difference on the valve.

In case the Kv-value in a thermostatic valve is limited to a predetermined maximum value, designated Kvs-value, the flow through the valve will be regulated with the thermostatic function as the authority until the positioning of the valve gets so big that the Kv-value has reached its predetermined maximum Kvs-value. The thermostatic function has then lost its authority and the flow is limited to a maximum flow which will now only be dependent on the pressure difference on the valve, but will nevertheless still vary in response to varying pressure difference.

A corresponding dynamic limitation of the flow, which is included in the present invention, is characteristic in that the Kvs-value is a self-regulating parameter which is dependent on the pressure difference on the valve in such a manner that the flow through the valve remains constant by varying pressure difference.

The dependency of the Kvs-value of the pressure difference may be found by expressing the differential level of the flow by the Kvs-value and the pressure difference. The following is given:

$$Q = Kvs \cdot DP^{1/2} \rightarrow dQ\max = \frac{1}{2} \cdot Kvs \cdot DP^{1/2} \cdot dDP + DP^{1/2} \cdot dKvs$$

$$\wedge dQ\max = 0$$

$$\rightarrow \frac{1}{2} \cdot Kvs \cdot DP^{1/2} \cdot dDP = -DP^{1/2} \cdot dKvs$$

Figure 2:
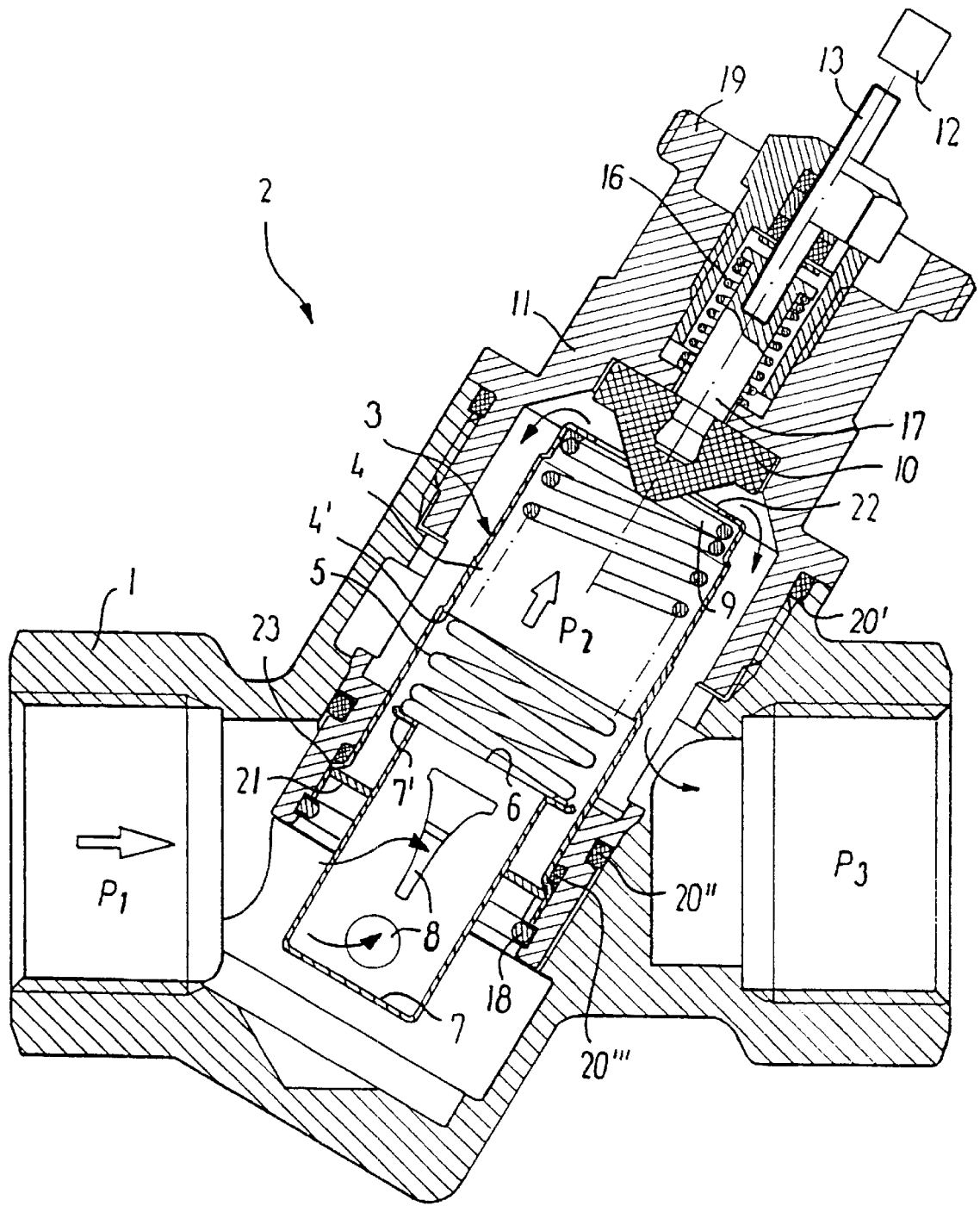
FIG. 2 shows the regulating insert in a non-activated/open state, mounted in a valve.
Figure 3:
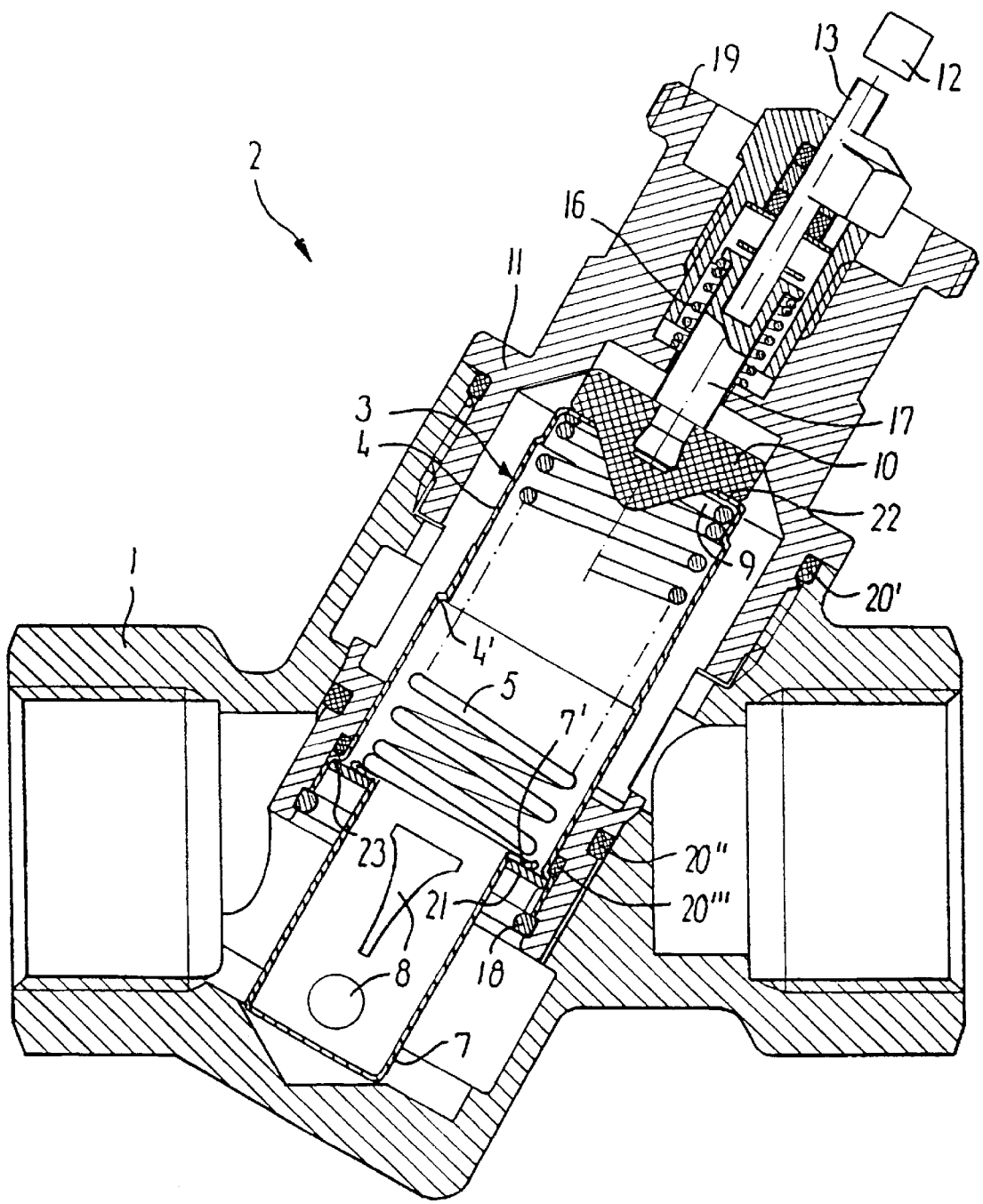
FIG. 3 shows the regulating insert in an activated/closed state, mounted in a valve.

The dynamic flow regulating body 3, which will be further described in FIGS. 2 and 3, has the characteristic feature that an increasing pressure difference on the body 3 will actuate same for compression of a spring actuated slidable part containing one or more restriction areas, which are limited by being cut-off by the fixed part whereby the Kvs-value varies in response to the pressure difference.

The result thereof is that the flow remains constant within a regulating range given by the spring.

The essential feature of the present invention is therefore a dynamic flow regulating body 3 which is substantially known and used for the sole purpose of limiting the flow in a system with a flowing medium, and is moreover used for regulating the flow under the authority of an electric actuator and/or a thermostatic constituent.

As further shown in FIGS. 1A–1C, the valve unit 2 comprises an insert housing 19 wherein parallel to the axis thereof a second housing 11 is mounted. In the center upper part of the second housing 11 there is mounted a valve cone 10 made of an elastomeric material. Extending from the valve cone 10 in an upward direction is a spindle/piston rod 17, which is connected at its other end to an activation means 13. By means of the activation means 13 the valve cone 10 may take an arbitrary axial position between normal non-activated/open position and an activated/closed position.

The second housing 11 comprises a spring ring 18 as well as a compression spring 16, which surrounds the spindle/piston rod 17. By compressing the end parts, the spring ring 18 (see FIG. 1B) may be inserted at the bottom of the second housing 11 opposite the compression spring 16 in the valve unit 2, where after insertion it will open itself to take a larger diameter and thus be retained in a position where it is surrounded by an external recess in the second housing 11 (see FIG. 2).

When the regulating insert 1 has been assembled to form a complete plug-in unit and has subsequently been fitted in various types of valves 2, the valve 2 is placed for regulation of a flow, for example for air conditioning systems, as shown in FIG. 1C, and/or floor heating systems. As will appear from FIG. 1C, the flow regulating valve and the thermostatic valve form an integral unit 2 thereof.

FIGS. 2 and 3 show the regulating insert 1 mounted in the valve unit 2 where same may take two positions by means of the flow regulating body 3: nonactivated/open position and an activated/closed position.

The flow regulating body 3 comprises a first housing 4, which is axially fixed within the second housing 11, and has a partly closed end 22 forming a contact face of the other end 9 of the coil spring. The end 22 is only partly closed in that it is provided with a cylindrical opening centered on the axis, said opening normally allowing the medium to flow freely to the outlet of the valve unit, but which in this embodiment is used as a seat for the valve cone 10. The valve cone 10 is made of an elastomeric material and will produce an elastic squeeze around the end of the spindle/piston rod 17 being enclosed by the valve cone 10.

By an external pressure, an activation means 13, for example an extension of the piston rod 17 parallel to the axis, will activate the spindle/piston rod 17 in a downward direction while at the same time compressing the coil spring 5 with the result that the valve cone is activated in the same direction and will limit the opening between the valve cone 10 and the seat. In this manner it is possible to modulate the degree of opening as a result of a varying positioning by the activation means 13. The positioning of the activation means 13 may be provided by a not shown self-acting thermostatic constituent or an electronically activated motor actuator.

At its lower end 23, the first housing 4 engages a slidable bottom cup 7, which is surrounded by a restriction disc 21, which restriction disc has been mechanically fixed to the first housing 4 by means of a 3-spot flanging.

The slidable bottom cup 7 has at least one inlet opening 8 being arranged/distributed on the cylinder surface of the bottom cup. The open end 7' of the slidable bottom cup 7 forms a contact face for the first end 6 of the coil spring, whereas the partly closed end 22 of the first housing 4 forms the second contact face for the coil spring 5. The parts in the flow regulating insert are held together by the 3-spot flanging of the restriction disc 21 in the first housing 4.

The bottom cup 7 may be actuated to take an axial movement (positioning) within the first housing 4 by a difference in the pressures P1 and P2. P1 is the pressure measured by inflow to the regulating insert 1, P2 is the pressure measured inside the first housing 4 itself, whereas P3 is the pressure measured after passage of the first housing 4. Acting on the projected area of the bottom of the cylinder, this pressure difference (P1–P2) will exert an axial force on the bottom cup 7 which will correspond to the spring force being a result of the compression of the coil spring 5. The bottom cup 7 will accordingly take an axial position relative to the first housing 4 where there will be a balance of forces. The extreme positions of the axial movement of the bottom cup 7 are determined by the contact thereof against the restriction disc 21 (see FIG. 3) and at the opposite end by the impact thereof against the inner recess 4' in the first housing 4.

Under varying positionings of the bottom cup 7, the inlet opening 8 will be cut off by the surrounding restriction disc 21, and the cleared inlet area through the inlet opening 8 will thus vary in dependence of the geometric design and the positioning of the bottom cup. In order to achieve a self-regulating constant flow, the geometric design of the inlet opening 8 must be such that the Kvs-value varies in response to the pressure difference, i.e. as a differential pressure between the change in the pressure difference and the change in the Kvs-value of the body, where the differential area change is proportionate to the differential change of the Kvs-value (dKvs), and where the change in the positioning of the bottom cup 7 is proportionate to changes in the pressure difference (PI–P2), (dDP).

In a normal non-activated/open position (FIG. 2), the compression spring 16 will actuate spindle/piston rod 17 in an upward direction. By means of the elastomeric deformation forces retaining the valve cone 10 in a locked contact with the spindle/piston rod 17, the valve cone 10 will be positioned for engagement with the insert housing 19. In this position the medium will flow freely between the valve cone 10 and the partly closed end 22 of the first housing. The pressure difference P1–P2 will therefore be big and be close to the total pressure difference P1–P3. The pressure difference P1–P2 will actuate the bottom cup 7 to take an axial positioning, whereby the compression spring 5 is compressed until a force balance is achieved between the compressive force of the compression spring, which acts upon the bottom cup 7 in a downward direction, and the force which, as the result of the pressure difference P1–P2, acts upon the bottom cup 7 in an upward direction. On condition that the geometric design of the inlet opening 8 is as described above, the cleared inlet area will be cut off by the surrounding restriction disc 21 to take exactly that size which by the given pressure difference P1–P2 will result in the flow being maintained constant.

The flow regulating body 3 will accordingly have full authority for maintaining a constant maximum flow in the valve.

In an activated/closed position (FIG. 3), a not shown external thermostatic constituent and/or electric actuator will activate the activation means 13 in a downward direction thereby exerting pressure on the spindle/piston rod 17 and compressing the compression spring 16 until the valve cone 10 reaches a position where it is mechanically stopped by the partly closed end 22 of the first housing. In this state there will be closed for a medium flow in the valve 2, and the pressures P1 and P2 will take the same value, such that there will accordingly be no pressure difference P1–P2. The compression spring 5 will act on the bottom cup 7 in a downward direction until same is fully open in its extreme position engaging the restriction disc 21. This will clear the entire inlet opening 8 with the maximum inlet area available until the activation means 13 has again opened the temperature regulating part for the positioning wherein the pressure difference P1–P2 has increased so much that it may overcome the tension force of the coil spring 5. In this position the temperature regulating part will accordingly have full authority.

The authority changes abruptly between the flow regulating body 3 and the temperature regulating part.

However, both regulating parts will lose the authority if the pressure difference P1–P2 increases beyond a maximum level being determined by the situation where the bottom cup 7 engages the internal recess 4' in the first housing 4. Then there is no dynamic compensation of the flow by further increases in the pressure difference.

To prevent internal leakage between the regulating insert 1 and the insert housing 19, sealing rings 20' have been fitted, and to prevent external leakage between same, O-ring 20 has been fitted, and to counter uncontrollable leakage between the flow regulating body 3 and the second housing 11 a seal has been provided with O-ring 20''' mounted on the lower part of the insert housing 19 parallel to the axis of the spring ring 18.

What is claimed is:

1. A regulating insert for mounting in valves comprising:
   a dynamically flow regulating body, said body comprising a first housing within a second housing with a coil spring arranged about an axis thereof, said coil spring having a first end and a second end, with the first end engaging a slidable bottom cup provided with at least one inlet opening for permitting the flow of liquid therein, said opening having an adjustable flow area,
   wherein the second end of the coil spring opposite the first end engages a partly closed end of the second housing, said partly closed end comprising a cylindrical opening providing a seat for a valve cone situated within the second housing, with the position of said valve cone being regulated by first means via an activation means.

2. The regulating insert of claim 1, wherein the first means comprise a thermostat.

3. The regulating insert of claim 1, wherein the first means comprise an actuator.

4. The regulating insert of claim 1, wherein the second housing comprises a compression spring surrounding a spindle/piston rod, said spindle/piston rod connecting the valve cone with the activation means.

5. The regulating insert of claim 1, wherein the first housing is mounted parallel to the axis of and within the second housing between which at least one seal ring is situated.

6. The regulating insert of claim 1, wherein the second housing comprises a spring ring arranged at the bottom of the second housing and opposite the position of the compression spring.

7. The regulating insert of claim 1 disposed in an air conditioning system.

8. The regulating insert of claim 1 disposed in a floor heating system.

9. A valve unit for dynamic flow regulation comprising a regulating insert, said regulating insert comprising a dynamically flow regulating body, said body comprising a first housing within a second housing with a coil spring arranged about an axis thereof, said coil spring having a first end and a second end, with the first end engaging a slidable bottom cup provided with at least one inlet opening for permitting the flow of liquid therein, said opening having an adjustable flow area, wherein the second end of the coil spring opposite the first end engages a partly closed end of the second housing, said partly closed end comprising a cylindrical opening providing a seat for a valve cone situated within the second housing, with the position of said valve cone being regulated by first means via an activation means.

10. The valve unit of claim 9, wherein the first means comprise a thermostat.

11. The valve unit of claim 9, wherein the first means comprise an actuator.

12. The valve unit of claim 9, wherein the second housing comprises a compression spring surrounding a spindle/piston rod, said spindle/piston rod connecting the valve cone with the activation means.

13. The valve unit of claim 9, wherein the first housing is mounted parallel to the axis of and within the second housing between which at least one seal ring is situated.

14. The valve unit of claim 9, wherein the second housing comprises a spring ring arranged at the bottom thereof and opposite the compression spring.

15. The valve unit of claim 9 disposed in an air conditioning system.

16. The valve unit of claim 9 disposed in a floor heating system.

17. A valve unit comprising:

a flow regulating body comprising a first housing having a proximal end with an opening that forms a seat for receiving a portion of a valve cone and a distal portion with an opening for receiving a moveable cup therein, and a coil spring abutting the proximal end of the first housing and the cup; and a second housing with the valve cone disposed therein, the valve cone having a spindle/piston rod extending therefrom with a compression spring disposed around the rod and operatively associated therewith, wherein the housings, valve cone, moveable cup, rod, and springs are disposed about a common axis, the positions of the housings are axially fixed with respect to each other, and the moveable cup is provided with at least one opening for permitting flow of a flowing medium.

18. The valve unit of claim 17, wherein:

the distal portion of the first housing comprises a restriction disc that defines the opening for receiving the moveable cup therein; and the moveable cup comprises an end with a contact face and an opening, wherein the contact face is disposed within the first housing and the restriction disc is configured and dimensioned to limit movement of the moveable cup.

19. The valve unit of claim 17, further comprising a spring ring disposed proximate the distal portion of the first housing.

20. The valve unit of claim 17, further comprising a seal disposed between the flow regulating body and the second housing.

21. The valve unit of claim 17, further comprising an actuator operatively associated with the spindle/piston rod.

* * * * *